United States Patent
Warech

(10) Patent No.: US 12,466,326 B2
(45) Date of Patent: Nov. 11, 2025

(54) UNIVERSAL EXPANDING ROOF RACK

(71) Applicant: Extang Corporation, Ann Arbor, MI (US)

(72) Inventor: Cameron Warech, Lawrenceville, GA (US)

(73) Assignee: EXTANG CORPORATION, Ann Arbor, MI (US)

( * ) Notice: Subject to any disclaimer, the term of this patent is extended or adjusted under 35 U.S.C. 154(b) by 456 days.

(21) Appl. No.: 17/954,400

(22) Filed: Sep. 28, 2022

(65) Prior Publication Data
US 2024/0101039 A1    Mar. 28, 2024

Related U.S. Application Data

(60) Provisional application No. 63/272,771, filed on Oct. 28, 2021.

(51) Int. Cl.
*B60R 9/045*    (2006.01)

(52) U.S. Cl.
CPC .................................. *B60R 9/045* (2013.01)

(58) Field of Classification Search
CPC ...................................................... B60R 9/045
USPC ...................................................... 224/321
See application file for complete search history.

(56) References Cited

U.S. PATENT DOCUMENTS

| | | | |
|---|---|---|---|
| 3,253,755 A | 5/1966 | Bott | |
| 3,260,929 A * | 7/1966 | Hedgepeth | B60R 9/00 224/500 |
| 3,325,067 A * | 6/1967 | Helm | B60R 9/045 224/330 |
| 4,076,157 A | 2/1978 | Hedstrom et al. | |
| 4,223,689 A * | 9/1980 | Cox | B60P 3/38 135/904 |
| 5,511,709 A | 4/1996 | Fisch | |
| 7,011,239 B2 * | 3/2006 | Williams | B60R 9/042 224/310 |
| 7,367,615 B1 * | 5/2008 | Fallis, III | B60J 7/026 296/220.01 |
| 10,279,748 B2 | 5/2019 | Aftanas et al. | |
| D890,684 S | 7/2020 | Ekstrom | |
| D893,397 S | 8/2020 | Ekstrom | |
| D921,772 S | 6/2021 | Hagler et al. | |
| 12,037,806 B2 * | 7/2024 | Wang | B60R 3/02 |
| 2006/0131934 A1 | 6/2006 | Uchida et al. | |
| 2008/0252100 A1 | 10/2008 | Salvador et al. | |
| 2010/0327033 A1 | 12/2010 | Payne | |

(Continued)

OTHER PUBLICATIONS

N-Fab Modular Roof Rack Basket | N-FAB 2022.

(Continued)

*Primary Examiner* — Peter N Helvey

(57) ABSTRACT

A roof rack assembly for a vehicle that includes a structure that extends in a cross-car direction of the vehicle, the roof rack assembly has: a first rack portion comprising a first rail and an opposing second rail; and a second rack portion comprising a third rail and an opposing fourth rail. The first rail has a cutout, and the second rail has a cutout, and the cutout of the first rail is configured to align with the cutout of the second rail. The structure of the vehicle is configured to extend through the aligned cutouts of the first rail and the second rail when the roof rack assembly is installed on the vehicle.

19 Claims, 10 Drawing Sheets

(56) References Cited

U.S. PATENT DOCUMENTS

2016/0214543 A1     7/2016   Goldberg
2019/0375337 A1    12/2019   Gauci

OTHER PUBLICATIONS

Modular Roof Rack-30" Series—Adjustable width 27"-36"—Axia Alloys 2022.
Smittybilt—Defender Roof Rack, Northland Automotive 2022.
Canadian Office Action dated Apr. 26, 2024, for Canadian Application 3,178,022.

* cited by examiner

UNIVERSAL EXPANDING ROOF RACK

PRIORITY

This application claims the benefit of U.S. 63/272,771 filed on Oct. 28, 2021, the entirety of which is hereby incorporated by reference herein for all purposes.

FIELD

These teachings relate to a roof rack assembly for a vehicle, and more particularly to a vehicle roof rack assembly that can be reconfigured to fit a variety of vehicle platforms and/or reconfigured for a variety of uses.

BACKGROUND

A roof rack assembly is a structure that is attachable to a vehicle roof for the purpose of securing and/or transporting cargo such as skis, bicycles, luggage, building materials, containers, and the like. Typical roof rack assemblies have a fixed size, which may limit the size and/or amount of cargo that may be secured and/or transported. Moreover, many roof rack assemblies are designed for specific vehicle types, thus limiting vehicle-to-vehicle compatibility. That is, a roof rack assembly intended for a large SUV may be too large for a compact passenger vehicle. In contrast, a roof rack assembly intended for a small compact passenger vehicle may be too small for a large SUV. It would be desirable to have a roof rack assembly that overcomes at least some of the deficiencies in the art.

SUMMARY

The roof rack assembly according to these teachings overcomes many of the deficiencies known in the art. The roof rack assembly according to these teachings can be advantageously reconfigured or customized, to fit a variety of vehicle platforms. For example, the roof rack assembly can be reconfigured, resized, or moved to have a custom length, thus allowing a user to use the same roof rack assembly on a large SUV or a small compact passenger vehicle. For example, by having the roof rack assembly according to these teachings, a manufacturer or retailer can stock a single roof rack assembly part number or style and have it compatible with, or fit a variety of, different vehicle makes and models. For example, by having the roof rack assembly according to these teachings, a user can reconfigure or extend the roof rack assembly to carry large or long loads, and then reconfigure or collapse the roof rack assembly for other uses.

The roof rack assembly according to these teachings also features a quick and easy attachment method to the vehicle. By utilizing existing vehicle components to attach the roof rack assembly to, the roof rack assembly has a low-profile design, which improves vehicle aesthetics and aerodynamics.

The vehicle roof rack according to these teachings is configured to extend into one or more extended positions. The vehicle roof rack is configured to retract or collapse into one or more retracted positions. Advantageously, by having a vehicle roof rack according to these teachings, cargo of various size and shape can be accommodated on the vehicle roof rack by extending or collapsing the vehicle roof rack. Moreover, the size and shape of the vehicle roof rack can be adjusted to fit or accommodate various vehicle sizes, which may advantageously allow a consumer to purchase one roof rack and install it on multiple vehicles. Furthermore, such a roof rack having a universal fit may allow sellers to stock fewer different part numbers in inventory.

Many other benefits of the roof rack assembly according to these teachings can be recognized by one having ordinary skill in the art.

DETAILED DESCRIPTION

Figure 1A:
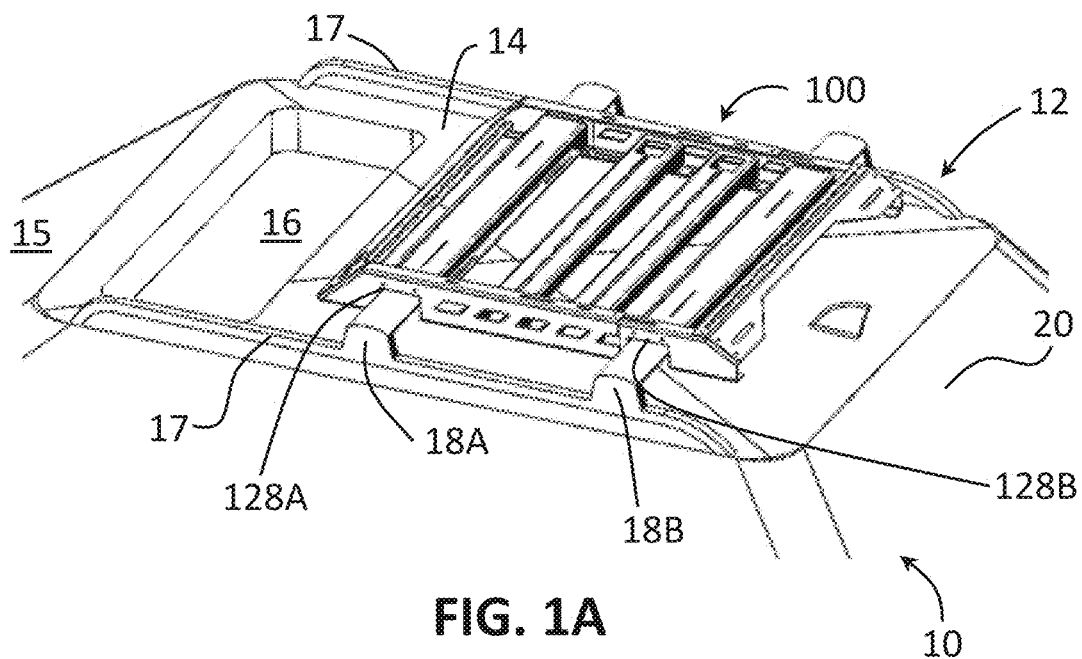
FIG. 1A is a partial perspective view of a vehicle, and a roof rack assembly attached to the vehicle.
Figure 1B:
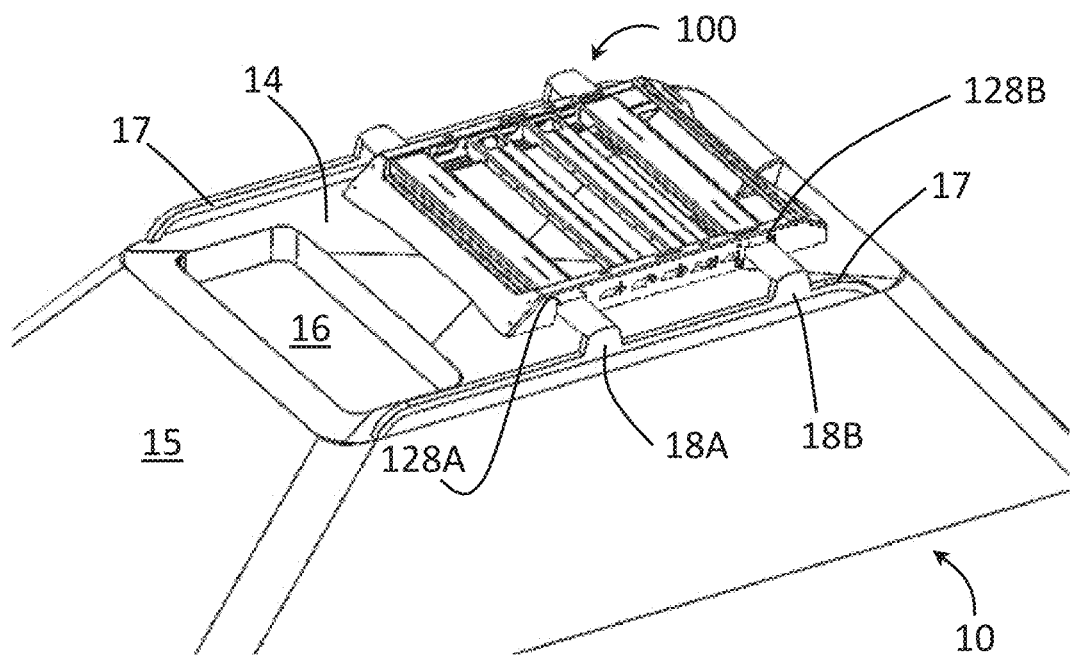
FIG. 1B is a partial perspective view of a vehicle, and a roof rack assembly attached to the vehicle.

FIG. 1A and FIG. 1B each illustrate a vehicle 10. The vehicle 10 includes a body 12 having a roof 14. The vehicle 10 or roof 14 may include a windshield 15 and sunroof 16 at a forward end of the vehicle 10 and a rear window or hatch 20 at a rear end of the vehicle 10. One or more vehicle cross bars 18A, 18B may be attached to the roof 14. The cross bars 18A, 18B may be attached to vehicle rails 17. The cross bars 18A, 18B may extend in a cross-car direction (side to side) and the vehicle rails 17 may extend in a for-aft direction (front to back). The vehicle cross bar 18A, 18B and/or vehicle rails 17 may be an original equipment (OE) component of the vehicle 10, or the vehicle cross bar 18A, 18B and/or vehicle rails 17 may be an aftermarket accessory attached to the vehicle 10 by or at the direction of a vehicle owner. The vehicle cross bars 18A, 18B may also be referred to herein as a structure associated with the vehicle.

A roof rack assembly 100 may be attached or secured to the vehicle 10. More specifically, the roof rack assembly 100 may be attached or secured to one or more of the vehicle cross bars 18A, 18B and/or vehicle rails 17. The roof rack assembly 100 may include one or more cutouts 128A, 128B that are configured to receive or surround or nest around the vehicle cross bars 18A, 18B. By having the vehicle cross bars 18A, 18B fit within the cutouts 128A, 128B, a sleek, low-profile design of the roof rack assembly 100 can be achieved, which may advantageously add to vehicle aesthetics and improve vehicle aerodynamics. Moreover, by having the vehicle cross bars 18A, 18B pass through the assembly 100, an improved assembly method can be achieved and the assembly 100 can be better secured to the vehicle 10.

Figure 2:
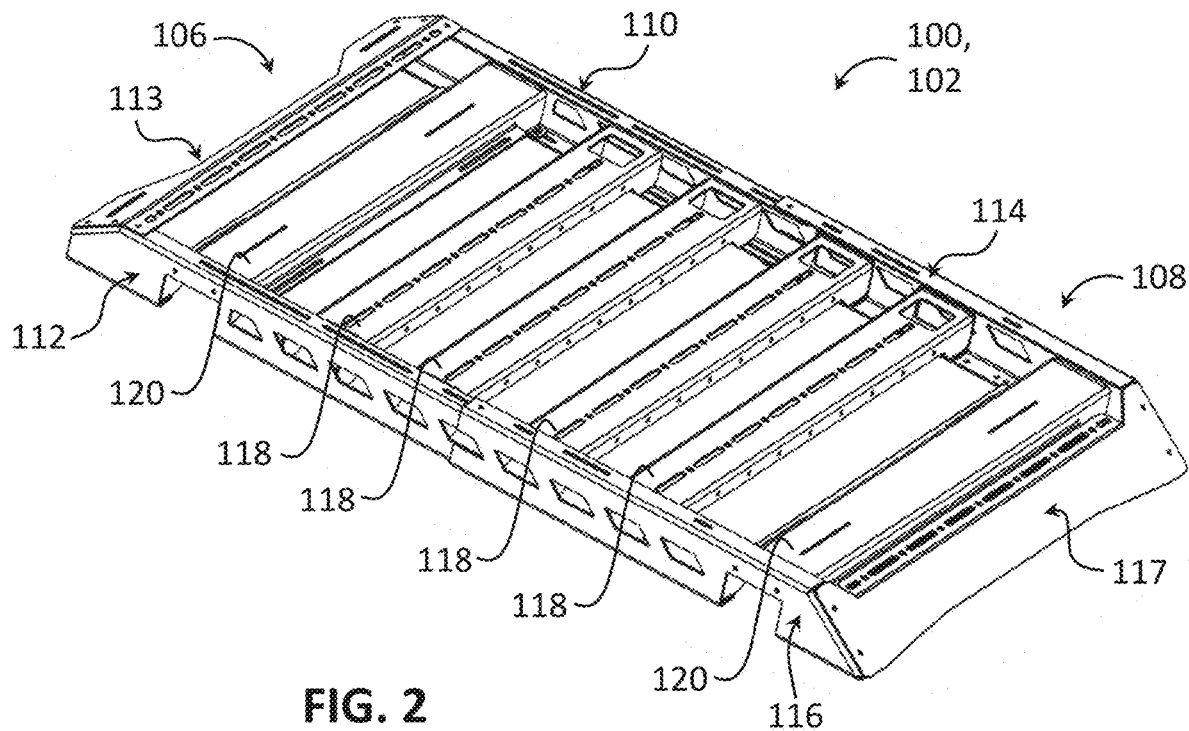
FIG. 2 is a perspective view of a roof rack assembly.
Figure 3:
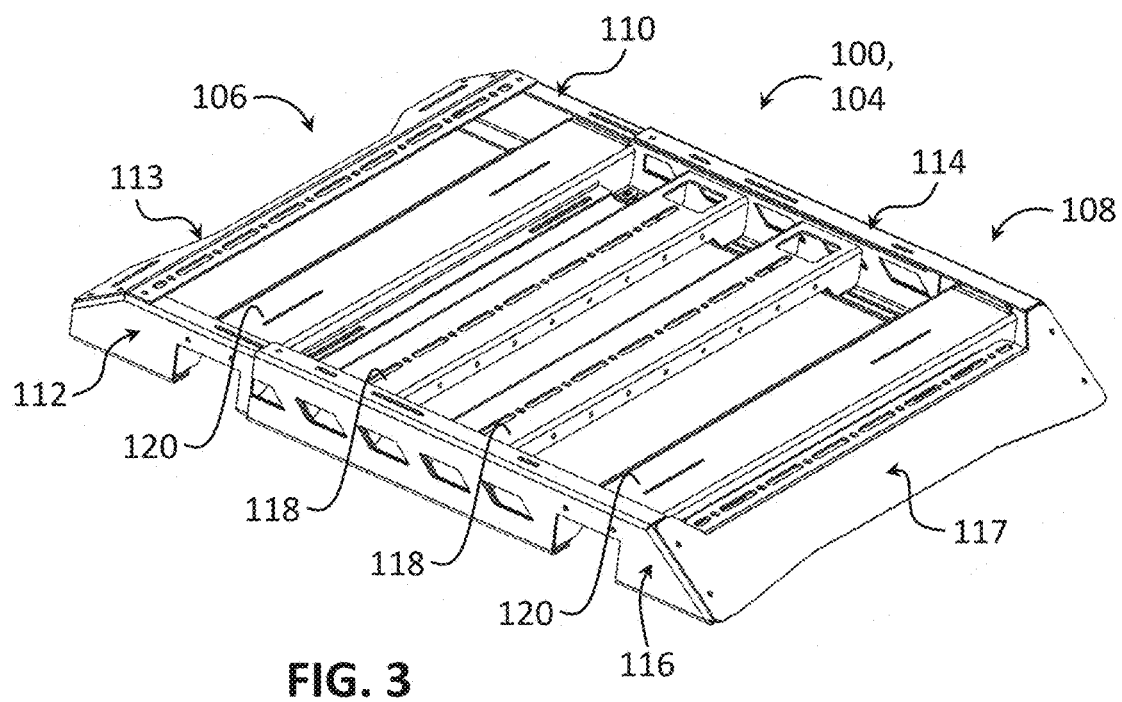
FIG. 3 is a perspective view of a roof rack assembly.

FIG. 2 illustrates the roof rack assembly 100 in an extended configuration 102. FIG. 3 illustrates the roof rack assembly 100 in a retracted configuration 104. As can be appreciated by one having ordinary skill in the art, the roof rack assembly 100 in the extended configuration 102 can be used to fit a larger or longer vehicle or carry larger or longer cargo, while the roof rack assembly 100 in the retracted configuration 102 can be used to fit a smaller or shorter vehicle or carry smaller or shorter cargo. However, the roof rack assembly 100 in both FIG. 2 and FIG. 3 is the same, just reconfigured to allow the rack 100 to have a universal fit for a variety of vehicles, sizes, and/or applications.

Referring to both FIG. 2 and FIG. 3, the roof rack assembly 100 comprises a first rack portion 106 and a second rack portion 108. When installed on the vehicle 10 (FIG. 1), the first rack portion 106 may be arranged to face a rear end of the vehicle 10 and the second rack portion 108 may be arranged to face a forward end of the vehicle, or vice versa.

The first rack portion 106 comprises a first rail 110, a second rail 112, and a connecting rail 113 connecting together the first rail 110 and the second rail 112. The second rack portion 108 comprises a third rail 114, a fourth rail 116, and a connecting rail 117 connecting together the third rail 114 and the fourth rail 116.

As shown, and as will be further discussed below, the first rack portion 106 is configured to mate with or nest with the second rack portion 108. More specifically, the first rail 110 is configured to nest with or fit within the third rail 114 and the second rail 112 is configured to nest with or fit within the fourth rail 116. However, it is within the scope of this disclosure that the third rail 114 can be configured to nest with or fit within the first rail 110 and the fourth rail 116 can be configured to nest with or fit within the second rail 112.

The roof rack assembly 100 may comprise one or more inner crossbars 118 and one or more outer crossbars 120. The inner crossbars 118 and the outer crossbars 120 extend between two or more of the corresponding opposing rails 110, 112 and 114, 116 of the first rack portion 106 and the second rack portion 108, depending on the location of the cross bars 118, 120 on the assembly 100. The cross bars 118, 120 may be attached to the corresponding opposing rails via one or more fasteners, discussed further below.

Figure 4A:
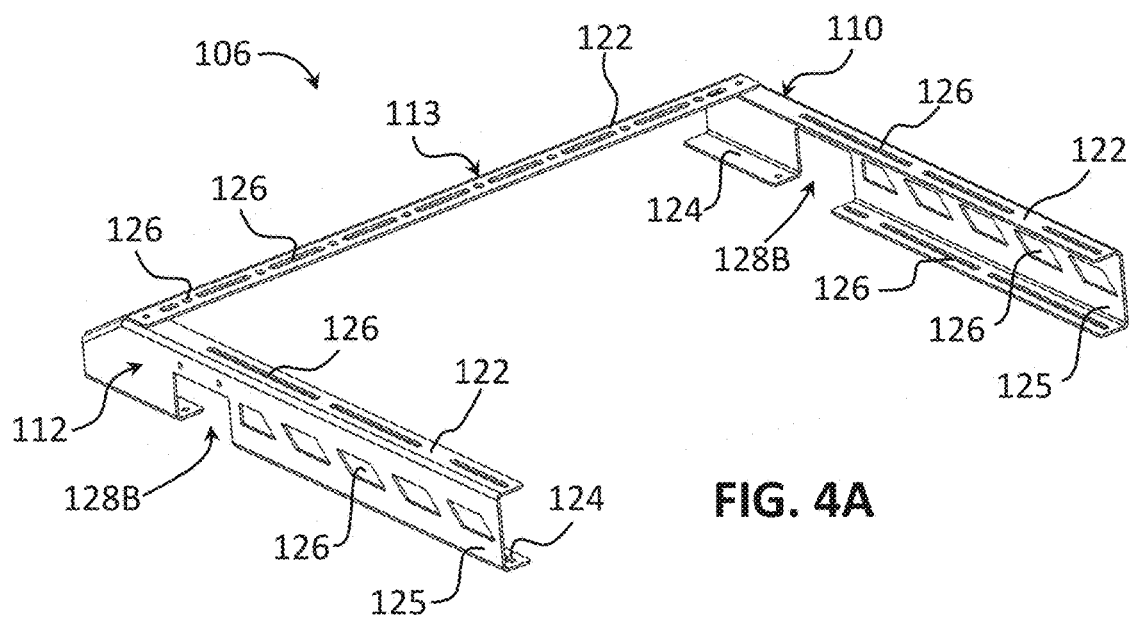
FIG. 4A is a perspective view of a first rack portion.
Figure 4B:
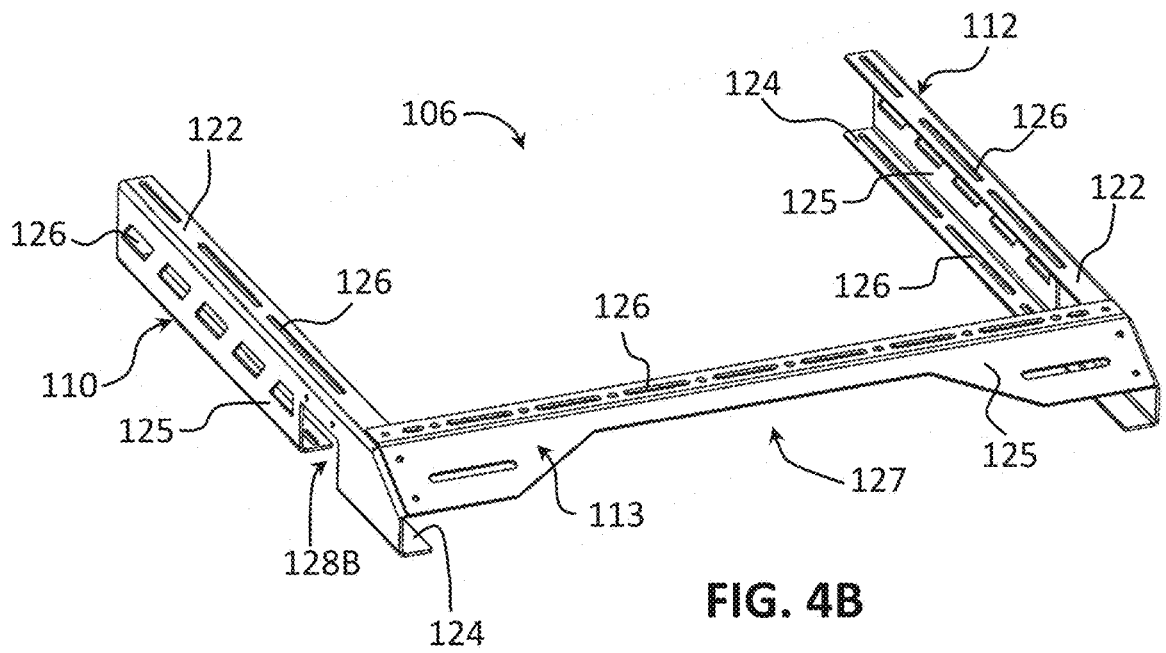
FIG. 4B is a perspective view of a first rack portion.

FIGS. 4A and 4B each illustrate the first rack portion 106. The description related to the first rack portion 106 may also relate to and apply to the second rack portion 108 and vice versa. In some configurations, the first rack portion 106 may be replaced by the second rack portion 108, or vice versa. In some configurations, the assembly may comprise two first rack portions 106 or two second rack portions 108. In some configurations, the position or orientation of the first rack portion 106 may be switched, swapped, or substituted by the position or orientation of the second rack portion 108. In other words, rather than the first rack portion 106 being adjacent to the front end of the vehicle, the second rack portion 108 may instead be located adjacent to the front of the vehicle and the first rack portion 106 may be arranged towards the rear of the vehicle.

The first rack portion 106 comprises a first rail 110, an opposing second rail 112, and a connecting rail 113 that is configured to connect together the first rail 110 and the second rail 112. The rails 110, 112, 113, may be formed from a single monolithic structure that is bent or formed to the illustrated shape or configuration, or from two or more structures that are joined together with one or more suitable fasteners such as screws, welds, brackets, or the like. In vehicle position, the first and second rails 110, 112 may extend along a length of the vehicle (in a fore-aft direction) and the connecting rail 113 may extend along a width of the vehicle (in a cross-car direction). The first rack portion 106 may have a C- or U-shape.

Both of the first rail 110 and the second rail 112 may have a similar structure but may be mirror images of one another. The first rail 110 and the second rail 112 may have a C- or U-shaped cross section. The first rail 110 and the second rail 112 may each have a top flange 122, an opposing bottom flange 124, and a connecting wall 125 the joints together the top and bottom flange is 122, 124. In some configurations, one or more of the aforementioned flanges may be omitted or may be configured to extend from the main body at a different angle than illustrated.

The connecting rail 113 may also have a similar structure to one or both of the rails 110, 112. Alternatively, the connecting rail 113 may be free of certain flanges, like the bottom flange 124 of the first and second rails 110, 112. The connecting wall 125 of the connecting rail 113 may have an angled or sloped surface (compared to the connecting wall 125 of the first or second rail 110, 112) to assist with aesthetics and/or aerodynamics. The connecting wall 125 may have a cutout 127 to assist with aerodynamics, to prevent drag while the vehicle is in motion. This cutout 127 can also accept a universal accessory mounting bracket that is designed to fit inside of the cutout geometry 127.

The top flange 122, the bottom flange 124, and/or the connecting wall 125 of one or more of the rails 110, 112, 113 may include one or more apertures 126. The one or more apertures 126 may have a variety of shapes and sizes, such as round, oval, oblong, rectangular, square, circular, star, etc. The one or more apertures 126 be used for a variety of functional purposes, such as, for example: joining or attaching the one or more cross bars 118, 120 to the rack portion 106; as an attachment point for securing or attaching cargo to the rack assembly 100 via one or more tie down straps, ropes, chains, or bungee cords; an attachment point for securing or attaching one or more adapters or mounts (i.e., a mount for securing a ladder or bicycle, for example); as an attachment point for securing or attaching one or more accessories such as a light, gas can, spare tire, etc.; used for visual or styling purposes; for air to pass through the assembly 100 to reduce drag; to reduce weight; to improve or simplify manufacturing processes; for fluid and/or debris to drain or pass through; or a combination thereof.

The first rail 110 and/or the second rail 112 may include one or more cutouts 128B. The one or more cutouts 128B may be included in the rails 110, 112 to provide clearance for the one or more vehicle cross bars 18B. For example, referring back to FIGS. 1A and 1B, when installed on the vehicle 10, a vehicle cross bar 18B may extend through one or both of the cutouts 128B. Accordingly, by providing the cutouts 128B so that the vehicle cross bars 18B pass through the assembly 100 (as opposed to the assembly 100 being installed on top of the vehicle cross bars 18B), the assembly 100 may have a low-profile appearance. Stated another way, the assembly 100 may sit close to the roof line of the vehicle 10, which may increase aesthetics and vehicle dynamics. Having the cutouts 128B nest over the cross bars 18B may also assist with securing the roof rack assembly to the vehicle. In some configurations, the one or more cutouts 128B may be omitted. In some configurations, the one or more cutouts 128B may be moved to a different location of the rail 110 and/or 112. For example, the cutout 128B may be generally centered on the first rack portion 106 and/or arranged towards an opposite end of the rack portion 106 than the illustrated end.

Figure 5A:
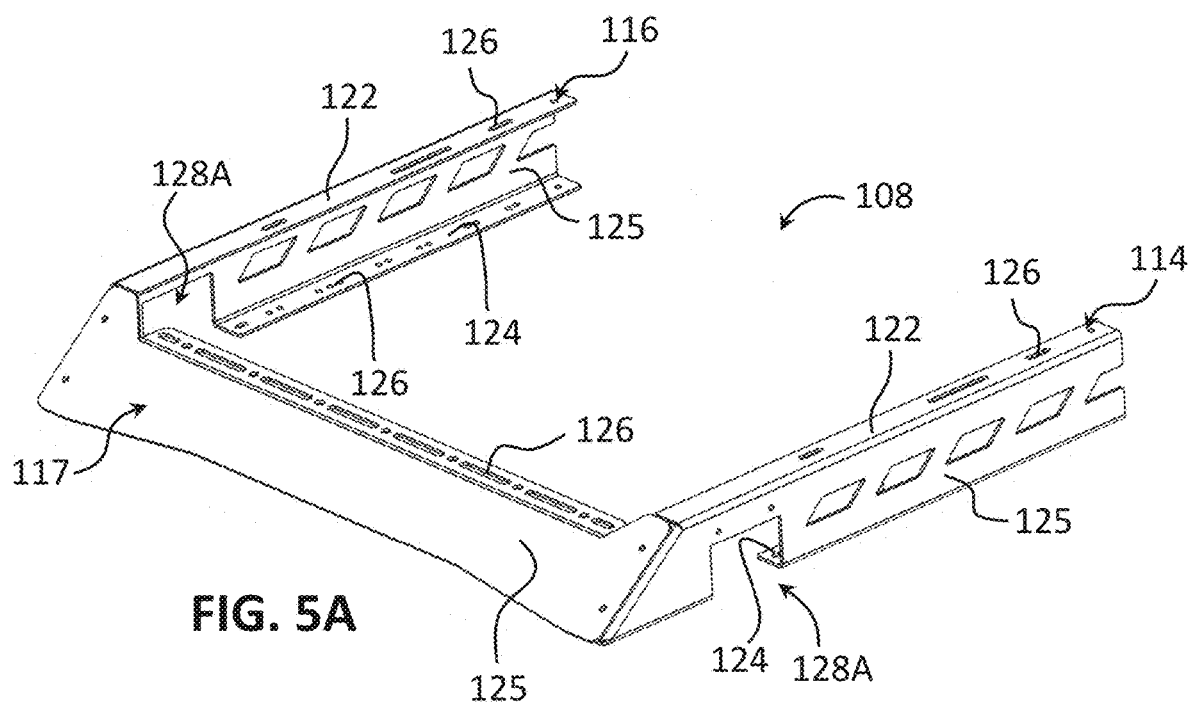
FIG. 5A is a perspective view of a second rack portion.
Figure 5B:
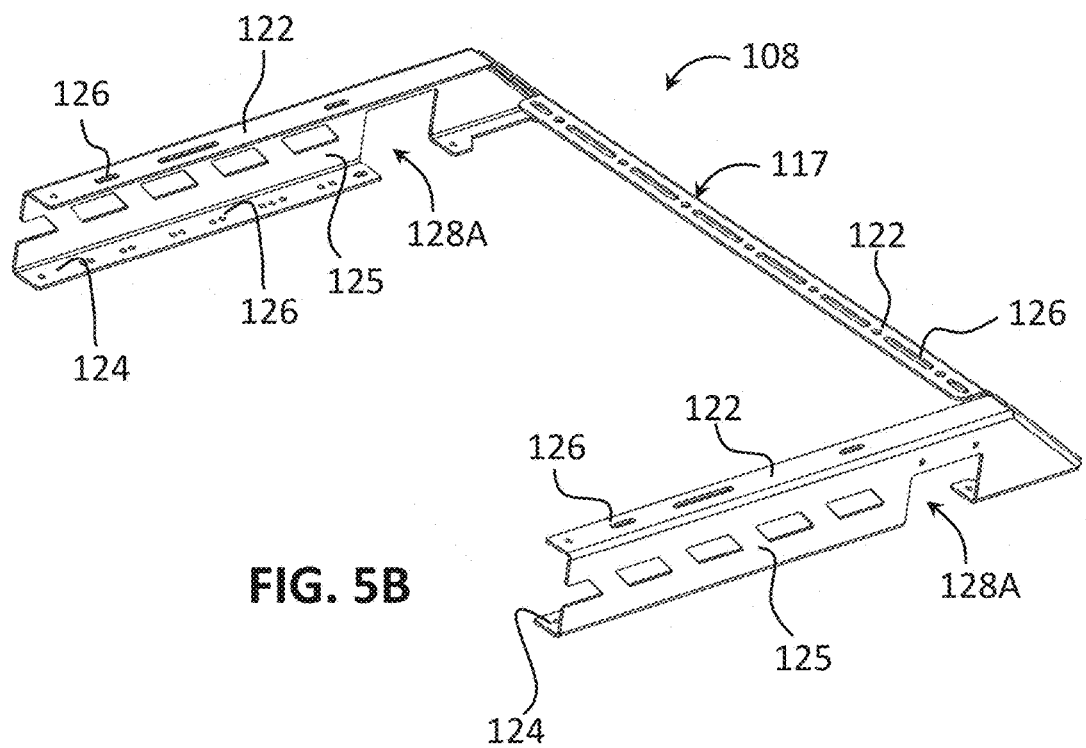
FIG. 5B is a perspective view of a second rack portion.

FIGS. 5A and 5B each illustrate the second rack portion 108. The description related to the second rack portion 108 may also relate to and apply to the first rack portion 106 and vice versa. The second rack portion 108 comprises a third rail 114, a fourth rail 116, and a connecting rail 117 that are configured to connect together the third rail 114 and the fourth rail 116. The rails 114, 116, 117, may be formed from a single monolithic structure that is bent to shape, or from two or more structures that are joined together with one or more suitable fasteners such as screws, welds, or the like. In vehicle position, the third rail 114 and fourth rails 116 may extend along a length of the vehicle (in a fore-aft direction) and the connecting rail 117 may extend along a width of the vehicle (in a cross-car direction).

Both of the third rail 114 and the fourth rail 116 may have a similar structure but may be mirror images thereof. The third rail 114 and the fourth rail 116 may have a similar structure (or identical) to the respective first rail 110 and second rail 112. A cross-section of the first and second rails may be substantially similar to a cross-section of the third and fourth rails. However, for the first and second rails to fit within the third and fourth rails, a cross section or size of the third and fourth rails should be slightly larger than that of the first and second rails. In configurations where the third and fourth rails fit within the first and second rails, then a cross section of the first and second rails should be slightly larger than a cross section of the third and fourth rails.

The third rail 114 and the fourth rail 116 may each have a top flange 122, an opposing bottom flange 124, and a connecting wall 125 the joints together the top and bottom flange is 122, 124. One or more of these structural features may be omitted or configured to extend at a different angle or orientation than currently illustrated.

The connecting rail 117 may also have a similar structure to one or both of the rails 114, 116. Alternatively, the connecting rail 117 may be free of certain flanges, like the bottom flange 124 of the third and fourth rails 114, 116. Moreover, the connecting wall 125 of the connecting rail 117 may have an angled or sloped surface (compared to the connecting wall 125 of the third and fourth rails 114, 116) to assist with aesthetics and/or vehicle dynamics. That is, by having a slanted or angled connecting wall 125 on the connecting rail 117 (which faces forward in vehicle position), drag can be reduced while the vehicle is in motion.

The top flange 122, the bottom flange 124, and/or the connecting wall 125 of one or more of the rails 114, 116, 117 may include one or more apertures 126. The one or more apertures 126 may be used for a variety of functional purposes such as disclosed above in the connecting rail first rack portion 106, such as, for example: joining or attaching the one or more cross bars 118, 120 to the rack portion 108; as an attachment point for securing or attaching cargo to the rack assembly 100 via one or more tie down straps, ropes, chains, or bungee cords; an attachment point for securing or attaching one or more adapters or mounts (i.e., a mount for securing a ladder or bicycle, for example); as an attachment point for securing or attaching one or more accessories such as a light, gas can, spare tire, etc.; used for styling purposes; reducing weight; or a combination thereof.

The third rail 114 and/or the fourth rails 116 may include one or more cutouts 128A. The one or more cutouts 128A may be included in the rails 114, 116 to provide clearance for the one or more vehicle cross bars 18A. More specifically, referring back to FIGS. 1A and 1B, when installed on the vehicle 10, the vehicle cross bar 18A may extend through the cutouts 128A. Accordingly, by providing the cutouts 128A so that the vehicle cross bar 18A passes through the assembly 100 (as opposed to the assembly 100 being installed on top of the vehicle cross bar 18A, the assembly 100 may have a low-profile appearance. Stated another way, the assembly 100 may sit close or hug to the roof line of the vehicle 10, as opposed to having a large gap between the roof 14 and the assembly 100, which may reduce aesthetics and vehicle dynamics.

Figure 6A:
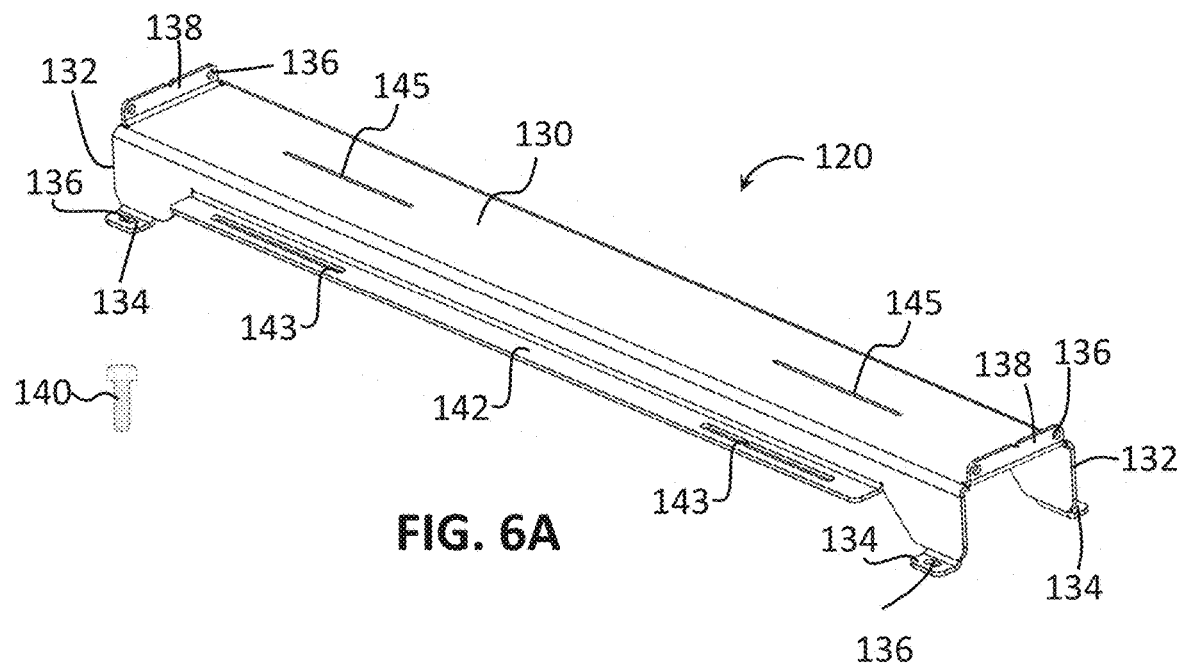
FIG. 6A is a perspective view of an outer cross bar.
Figure 6B:
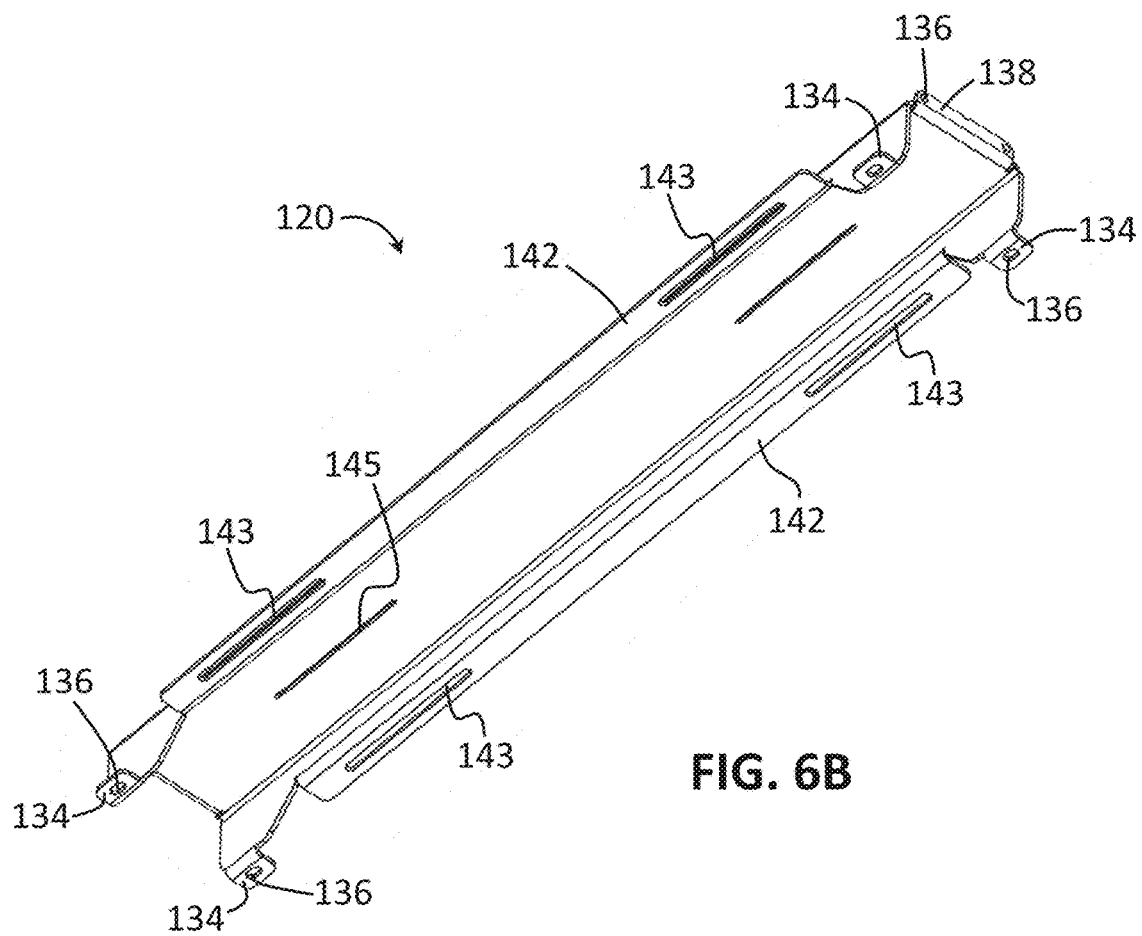
FIG. 6B is a perspective view of an outer cross bar.

FIG. 6A and FIG. 6B illustrate the outer cross bar 120. The outer cross bar 120 may be generally aligned with (extend between or extend over) the corresponding cutouts 128A, 128B in the corresponding, opposing rails 110, 112 and 114, 116.

The outer cross bar 120 comprises an elongated section 130 defined between opposing ends 132. One or both of the ends 132 may include one or more mounting flanges 134 or feet for connecting the cross bar 120 to the rails 110, 112, 114, 116. More specifically, the flanges 134 may include one or more apertures 136 that can be aligned with the one or more apertures 126 in the bottom flange 124 of the rails 110, 112, 114, 116 and secured thereto with one or more fasteners, such as a screw or bolt, or other fastening method like a weld or magnet. A removable fastener 140 such as a screw or bolt or quarter turn fastener may be advantageous to allow the cross bar 120 to be removable or repositionable in case a need arises to easily reconfigure the roof rack assembly 100 (i.e., to extend or contract the roof rack assembly 100 to fit another vehicle size or application, for example). Alternatively, a weld or other permanent adhesive may be used in situations where a more permanent assembly is desired.

One or both of the ends 132 of the cross bar 120 may include one or more mounting flanges 138 for connecting the cross bar 120 to the rails 110, 112, 114, 116. The mounting flange 138 may be upwardly turned relative to the elongated section 130. The flanges 138 may include one or more apertures 136 that can be aligned with the one or more apertures 126 in the top flange 122 of the rails 110, 112, 114, 116 and secured to one another with a fastener, such as a screw or bolt, or other fastening method like a weld. A removable fastener 140 such as a screw or bolt may be advantageous to allow the cross bar 120 to be removable or repositionable in case a need arises to reconfigure the roof rack assembly 100 (i.e., to extend or contract the roof rack assembly 100 to fit another vehicle size or application, for example).

One or both sides of the cross bar 120 may include a lateral flange 142. The flange 142 may include one or more apertures 143 for connecting the cross bar 120 and the roof rack assembly 100 to the vehicle cross bars 18A, 18B, which is discussed in greater detail below at FIGS. 12, 13, and 14. The lateral flange 142 may be located in a plane that is offset or generally parallel to the plane that includes top surface of the elongated section 130. Alternatively, the lateral flange may be located in the same plane as the top surface of the elongated section 130 or in a plane that is angled (acute or obtuse angle) relative to the top surface of the elongated section 130. The lateral flange 142 may be located on one side of the cross bar 120 or on both sides, as shown in FIG. 6B.

The cross bar 120 may include one or more apertures 145 defined in the elongated section 130, providing a peep hole or slot, to assist with aligning and connecting the cross bar 120 and the roof rack assembly 100 to the vehicle cross bars 18A, 18B. The apertures 145 may also service other decorative or functional purposes, such as those discussed above when referring to the aperture 126. One or more of the apertures 145 and/or 126 discussed above may provide for fluid and/or debris to pass through the structure of the vehicle rack.

The inner cross bar 118 may be substituted by a cross bar 120 and/or vice versa. Features from the inner cross bar 118 may be incorporated into the cross bar 120 and/or vice versa.

Figure 7A:
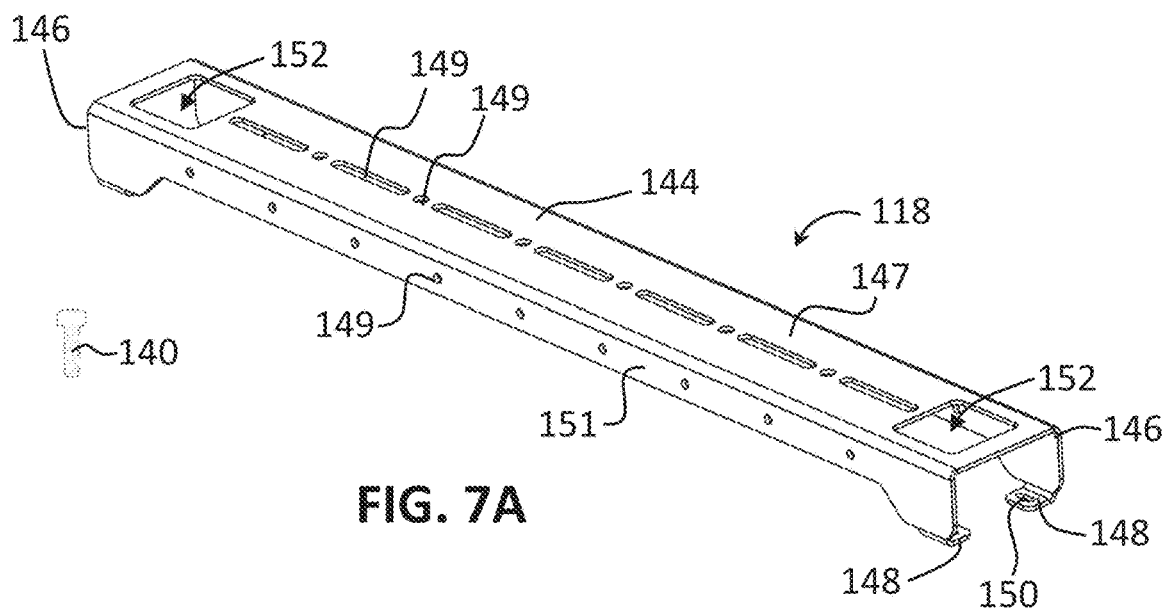
FIG. 7A is a perspective view of an inner cross bar.
Figure 7B:
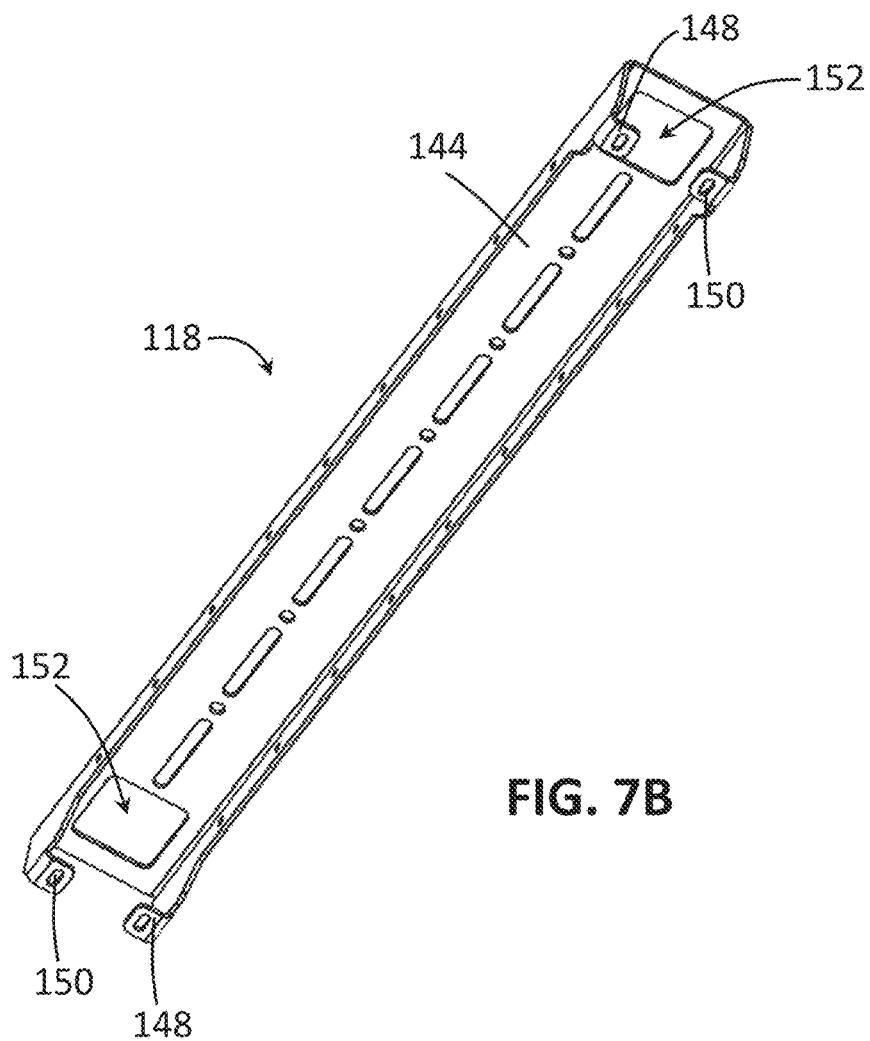
FIG. 7B is a perspective view of an inner cross bar.

FIG. 7A and FIG. 7B illustrates the inner cross bar 118. The inner cross bar 118 comprises an elongated section 144 defined between opposing ends 146. One or both of the ends 146 may include one or more mounting flanges 148 for connecting the cross bar 118 to the rails 110, 112, 114, 116. More specifically, the flanges 148 may include one or more apertures 150 that can be aligned with the one or more apertures 126 in the bottom flange 124 of the rails 110, 112, 114, 116 and secured thereto with a fastener, such as a screw or bolt, or other fastening method like a weld. A removable fastener 140 such as a screw or bolt may be advantageous to allow the cross bar 118 to be removable or repositionable in case a need arises to reconfigure the roof rack assembly 100 (i.e., to extend or contract the roof rack assembly 100 to fit another vehicle size or application, for example).

The elongated section 144 includes a top portion or surface 147 and side portions or surfaces 151. The top portion 147 and/or side portions 151 may include one or more apertures 149, 152. The one or more apertures 149, 152 may be used for a similar purpose or function as the one or more apertures 126 discussed above, including: serving as an attachment point for securing or attaching cargo to the rack assembly 100 via one or more tie down straps, ropes, chains, or bungee cords; serving as an attachment point for securing or attaching one or more brackets, adapters, or mounts (i.e., a mount for securing a ladder or bicycle, for example); serving as an attachment point for securing or attaching one or more accessories such as a light, gas can, spare tire, etc.; used for styling purposes; for draining fluid and/or debris; or a combination thereof.

During assembly of the roof rack, the one or more of the cross bars 120 can be substituted with one or more of the cross bars 118, or vice versa. One or more of the cross bars 120 may be omitted or duplicated. One or more of the cross bars 118 can be omitted or duplicated.

Figure 8A:
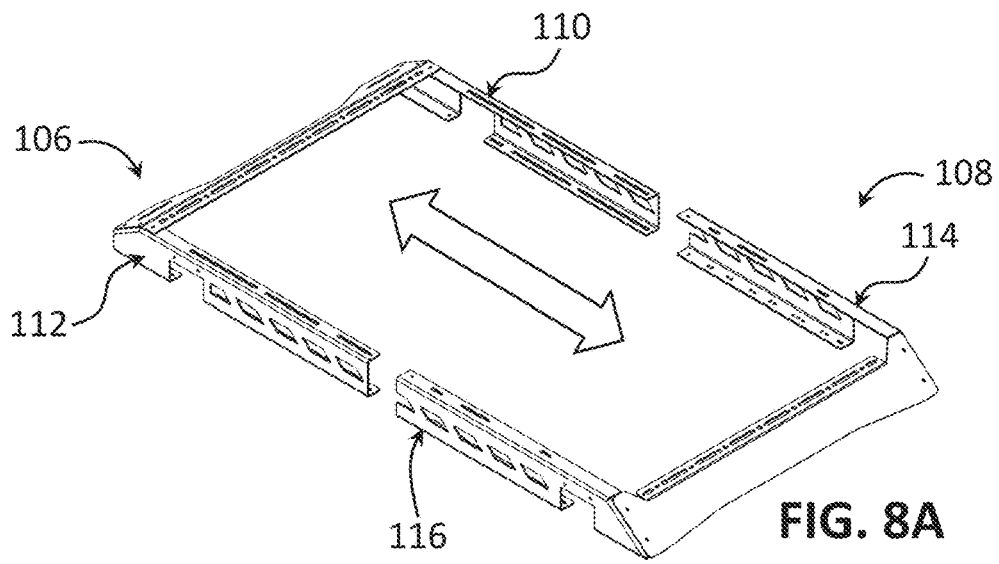
FIG. 8A is an exploded, perspective view of the first rack portion and the second rack portion.
Figure 8B:
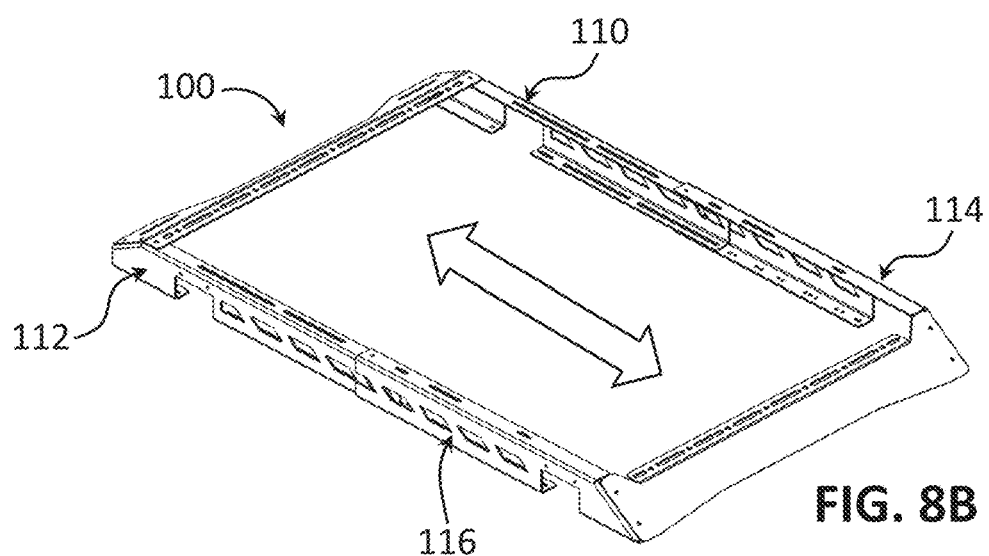
FIG. 8B is a perspective view of a roof rack assembly
Figure 8C:
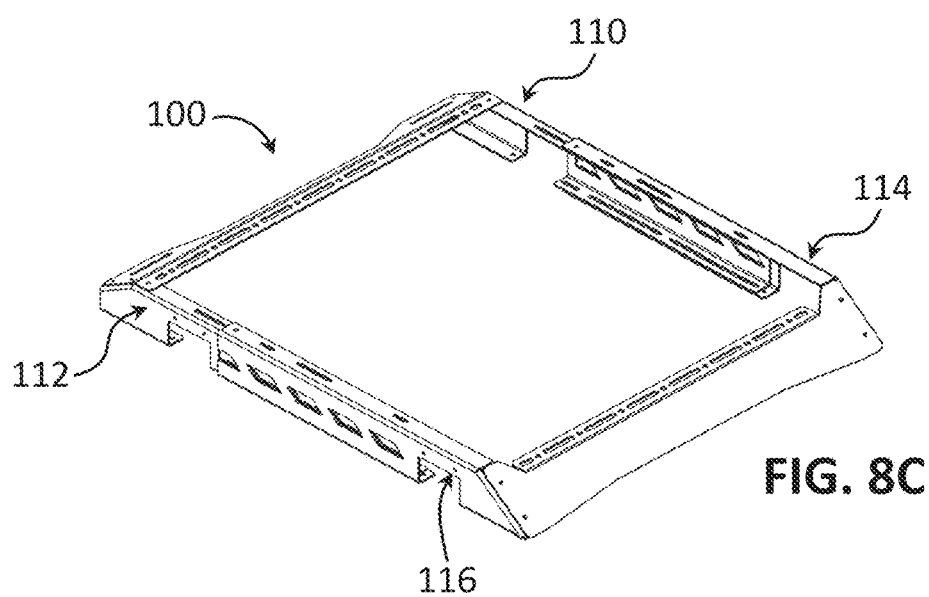
FIG. 8C is a perspective view of a roof rack assembly.

FIGS. 8A, 8B, and 8C illustrate the roof rack assembly 100 in various configurations. In FIG. 8A, the two rack portions 106, 108 are in a separated configuration, spaced apart from one another. In FIG. 8B, the two rack portions 106, 108 are brought together such that the first rack portion 106 mates with or nests with the second rack portion 108. More specifically, the first rail 110 is configured to nest within the third rail 114, and the second rail 112 is configured to nest withing the fourth rail 116. To accomplish such nesting, the size and shape of the first rail 110 is slightly smaller than a size and shape of the third rail 114 so that the first rail 110 can fit within the third rail 114. Similarly, the size and shape of the second rail 112 is slightly smaller than a size and shape of fourth rail 116 so that the second rail 112 can fit within fourth rail 116.

However, in other configuration, the sizes may be reversed such that the third rail 114 is configured to nest within the first rail 110, and the fourth rail 116 is configured to nest withing the second rail 112. To accomplish such nesting, the size and shape of the first rail 110 is slightly larger than a size and shape of the third rail 114 so that the third rail 114 can fit within the first rail 110. Similarly, the size and shape of the second rail 112 is slightly larger than a size and shape of the fourth rail 116 so that the fourth rail 116 can fit within the second rail 112.

The size of the roof rack assembly 100 illustrated in FIG. 8B (i.e., the length of the assembly 100 in the fore-aft direction) may be suitable for use with a larger vehicle, where the spacing between the vehicle cross bars (i.e., 18A, 18B; FIG. 1A, 1B) is larger or greater, compared with the size of the roof rack assembly 100 in FIG. 8C, which may be suitable for a smaller vehicle having a smaller spacing between the vehicle cross bars 18A, 18B. Accordingly, the vehicle roof rack assembly 100 according to these teachings is universal in nature, meaning the size or length of the assembly 100 (i.e., distance between connecting rails 113, 117; FIGS. 2 and 3) can be customized depending on the size of the vehicle and/or the spacing of the vehicle cross bars 18A, 18B. One having skill in the art realizes that a corresponding number of cross bars 118, 120 are installed in the assembly 100, depending on the size of the desired roof rack assembly 100. For example, the assembly 100 illustrated in FIG. 8B may have more cross bars 118, 120 than the assembly 100 illustrated in FIG. 8C. However, in some configurations depending on user preference, for example, the configuration illustrated in FIG. 8C may have more cross bars than the configuration illustrated in FIG. 8B.

Figure 9:
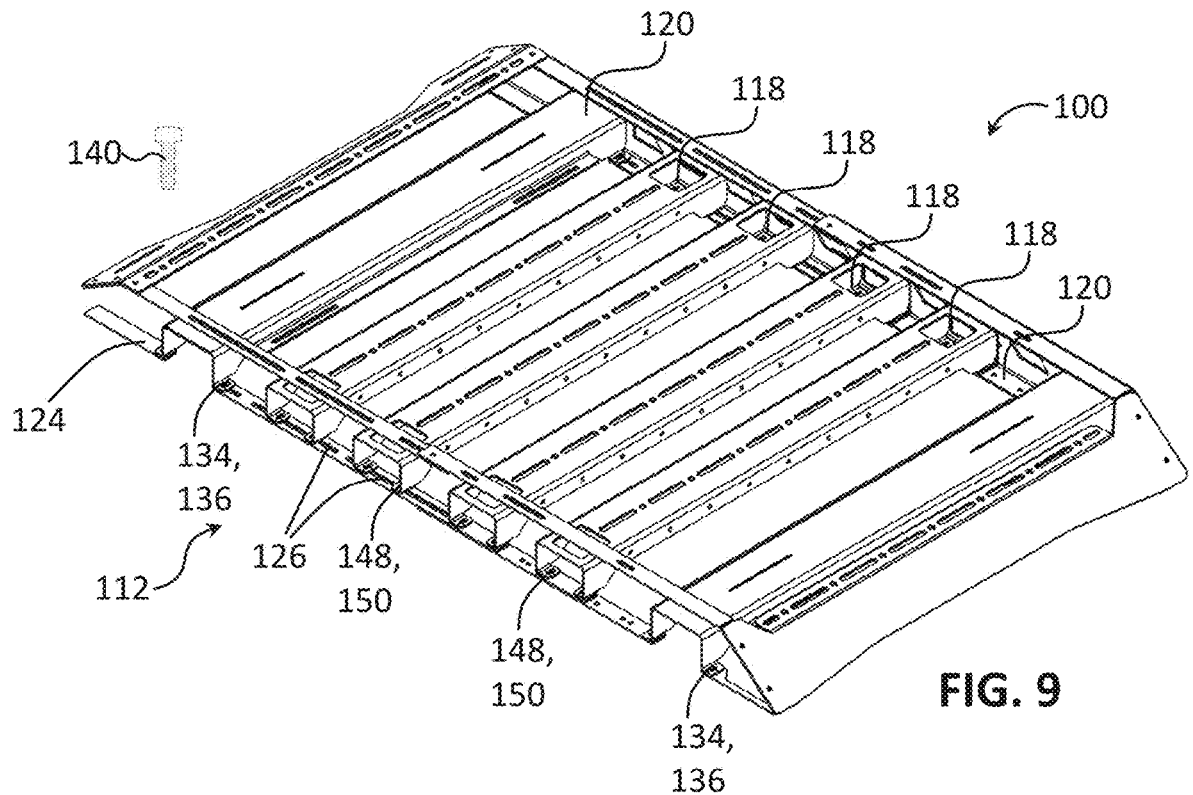
FIG. 9 is a perspective view of a roof rack assembly.

FIG. 9 illustrates a vehicle roof rack assembly 100, where the connecting wall 125 of the second rail 112 is removed for clarity. The assembly 100 comprises two outer cross bars 120 and four inner cross bars 118; however, as discussed above, the roof rack assembly 100 can include any number of inner cross bars 118, primarily depending on the desired size of the assembly 100.

The inner cross bars 118 may be secured to the rails 110, 112, 114, 116 with one or more fasteners 140 passing through the apertures 150 defined in the flanges 148 of the inner cross bars 118 and apertures 126 defined in the bottom flange 124 of the rails 110, 112, 114, 116. Additionally, or alternatively, a more permanent fastener such as a weld may be used to secure the flanges 148 to the rails 110, 112, 114, 116. Additionally, or alternatively, other types of fasteners may be used, including magnets, hook and loop fasteners, quarter turn fasteners, push pins, and the like.

The outer cross bars 120 may be secured to the rails 110, 112, 114, 116 with one or more suitable fasteners 140 passing through the apertures 136 defined in the flanges 134 of the outer cross bars 120 and apertures 126 defined in the bottom flange 124 of the rails 110, 112, 114, 116. Alternatively, a more permanent fastener such as a weld may be used to secure the flanges 134 to the rails 110, 112, 114, 116.

Figure 10:
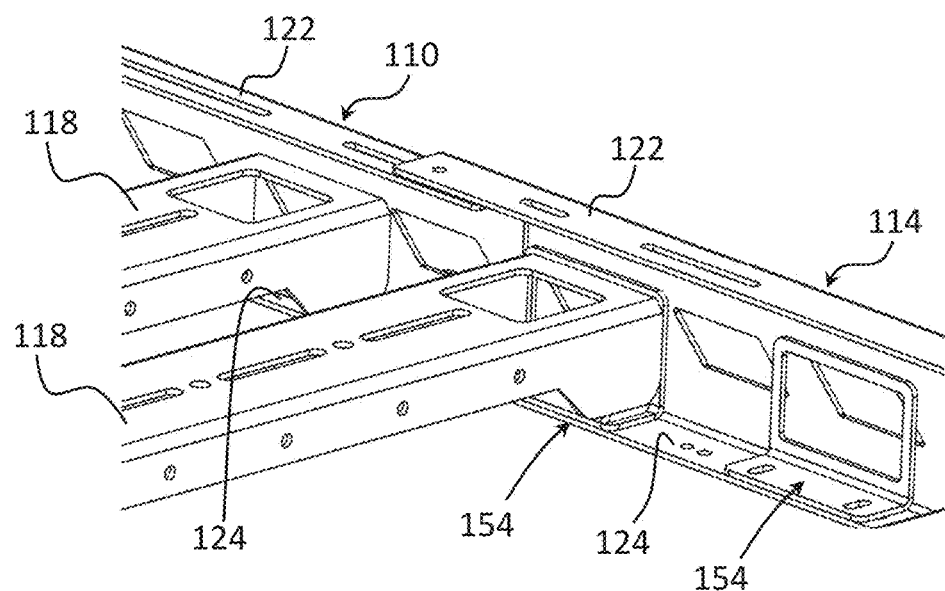
FIG. 10 is a partial perspective view of a roof rack assembly.

FIG. 10 illustrates the first rail 110 nested within the third rail 114. Nesting may mean that the first rail 110 at least partially fits within the third rail 114. Nesting may mean that the top 122 and bottom flanges 124 of the first rail 110 fit within or between the top 122 and bottom flanges 124 of the third rail 114. Nesting may mean that these rail sections are in direct contact with one another. Alternatively, one or more rubber or plastic or fabric components such as dampeners may be located between these rail sections, to prevent noise, vibrations, scratching, etc. during assembly and or driving conditions. Such plastic or rubber or metal, or composite or felt, etc. components may also provide an interference fit between the components, which may provide a more robust assembly and/or to take up any tolerance variations. Such components may include one or more washers, pads, spacers, shims.

FIG. 10 also illustrates two inner cross bars 118 attached to the first rail 110 and the third rail 114. The length of the two cross bars 118 is substantially the same. A distance between the opposing third rail 114 and the fourth rail 116 (not shown) is slightly larger than a distance between the first rail 110 and the second rail 112 (not shown), which allows for the first and second rails 112 to fit or nest within the third and fourth rails 114, 116. Accordingly, to make up for the slight size difference, a shim 154 may be provided between one or both ends of the inner cross bar 118 the third and/or fourth rails 114, 116. The shim 154 may be omitted on the cross bar 118 extending between the first and second rails 110, 112. The shim may be made from a suitable material, such as plastic, rubber, metal, composite, felt, fabric, and the like.

Figure 11:
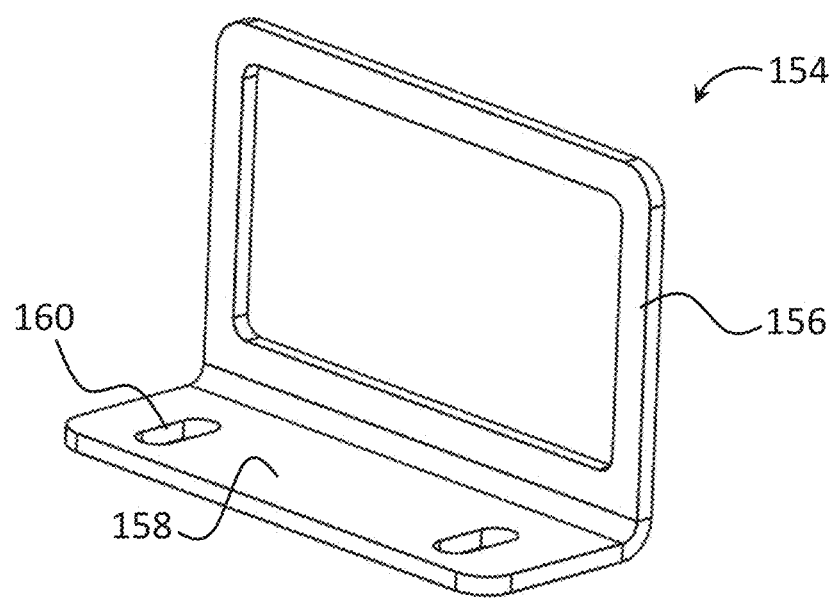
FIG. 11 is a perspective view of a shim.

FIG. 11 illustrates the shim 154. The shim 154 may be provided between an end of the cross bar 118 and the inside surface of the third and/or fourth rails 114, 116. The shim 154 may have a vertical component 156, that is configured to be sandwiched between one or both ends 146 of the inner cross bars 118 (See also, FIG. 7A-7B) and the inside surface of connecting wall 125 of the third and/or fourth rails 114, 116. Additionally, or alternatively, the shim 154 may have a horizontal component 158, that is configured to be sandwiched between the mounting flanges 148 and the bottom flange 124 of the third and/or fourth rails 114, 116. The horizontal component 158 may include one or more apertures 160, allowing for a fastener, like fastener 140, to pass therethrough. The vertical component 156 may also include a similar aperture for connecting to the connecting wall 125.

Figure 12:
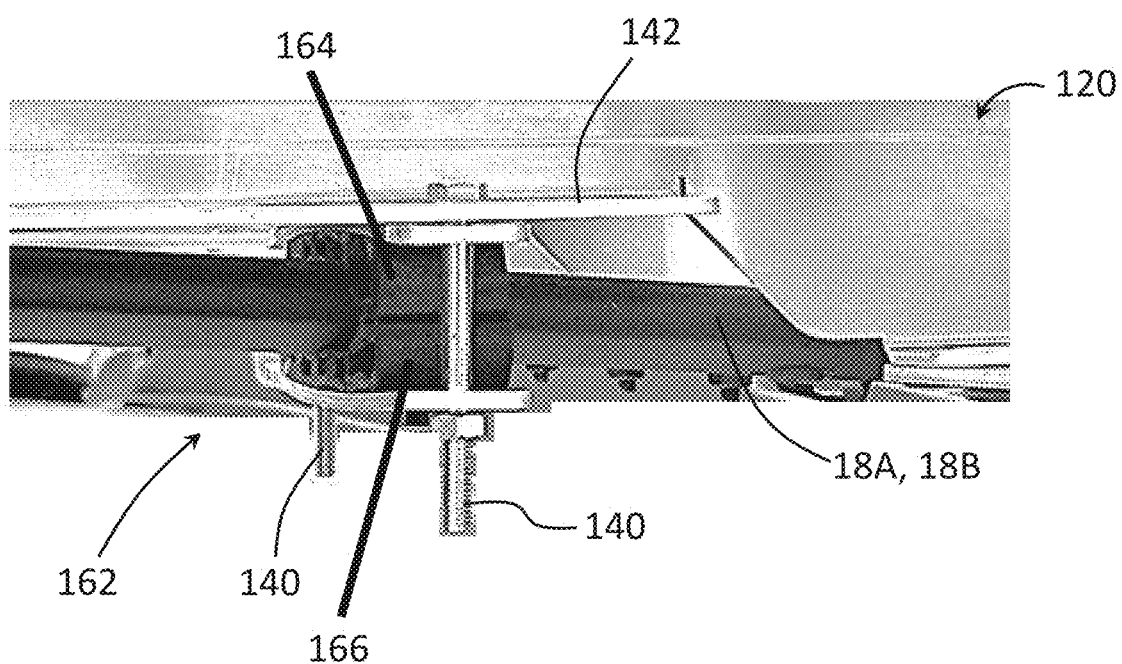
FIG. 12 is a perspective view of a mount.

FIG. 12 illustrates a mount 162. A mount 162 may connect or secure the assembly to the vehicle or more specifically the outer cross bar 120 with a vehicle cross bar 18A, 18B. The mount 162 includes an upper portion 164 and a lower portion 166 that cooperate to sandwich or clamp at least partially around the vehicle cross bar 18A, 18B. The upper and lower portions 164, 166 may be connected via a fastener 140 that also extends through the lateral flange 142 (See FIG. 6A, 6B) of the outer cross bar 120. The upper portion 162 and/or the lower portion 164 may include a rubber or flexible material that ma be clamped between two shims to securely clamp the cross bar 120 to the vehicle cross bar 18A, 18B, without damaging the vehicle cross bar 18A, 18B and reducing potential noise and vibrations.

Figure 13:
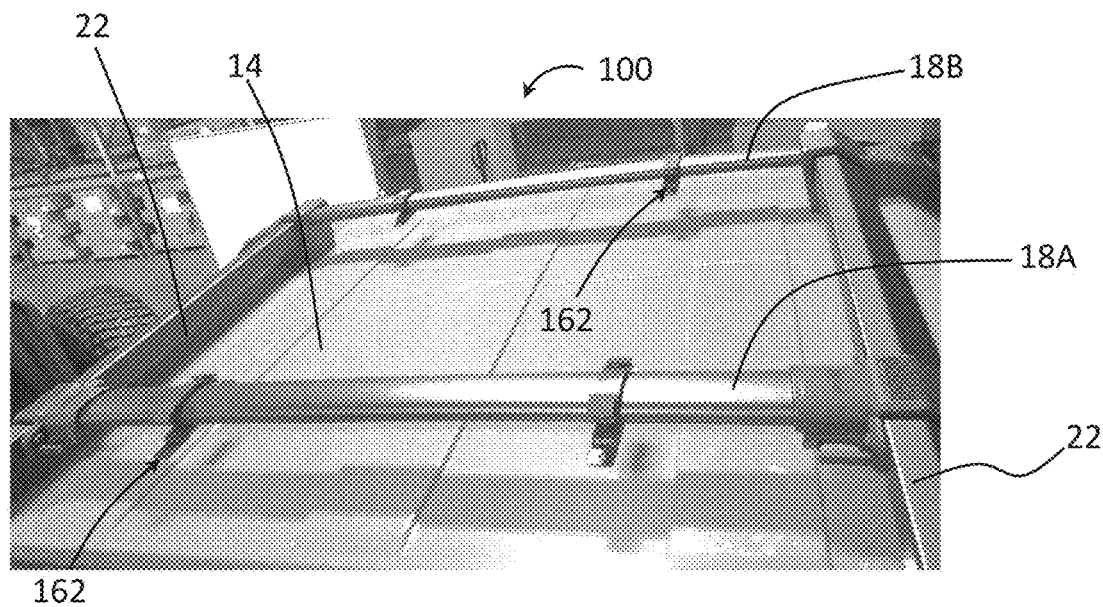
FIG. 13 is a partial perspective view of a vehicle and mounts attached to the vehicle cross bars.

FIG. 13 illustrates the roof 14 of the vehicle 10 and the cross bars 18A, 18B. The vehicle 10 may have a rail 22 that extends in a fore-aft direction (from front to back of the vehicle). The rail 22 may be supplied by the vehicle manufacturer (original equipment) or may be an aftermarket accessory installed by the vehicle owner or at the direction of the owner. The vehicle cross bars 18A, 18B may be connected to the rails 22. One or more mounts 162 may be connected to each cross bar 18A, 18B for connecting the vehicle rack assembly 100 to the vehicle 10. In this instance, each cross bar 18A, 18B has two mounts 162.

Figure 14:
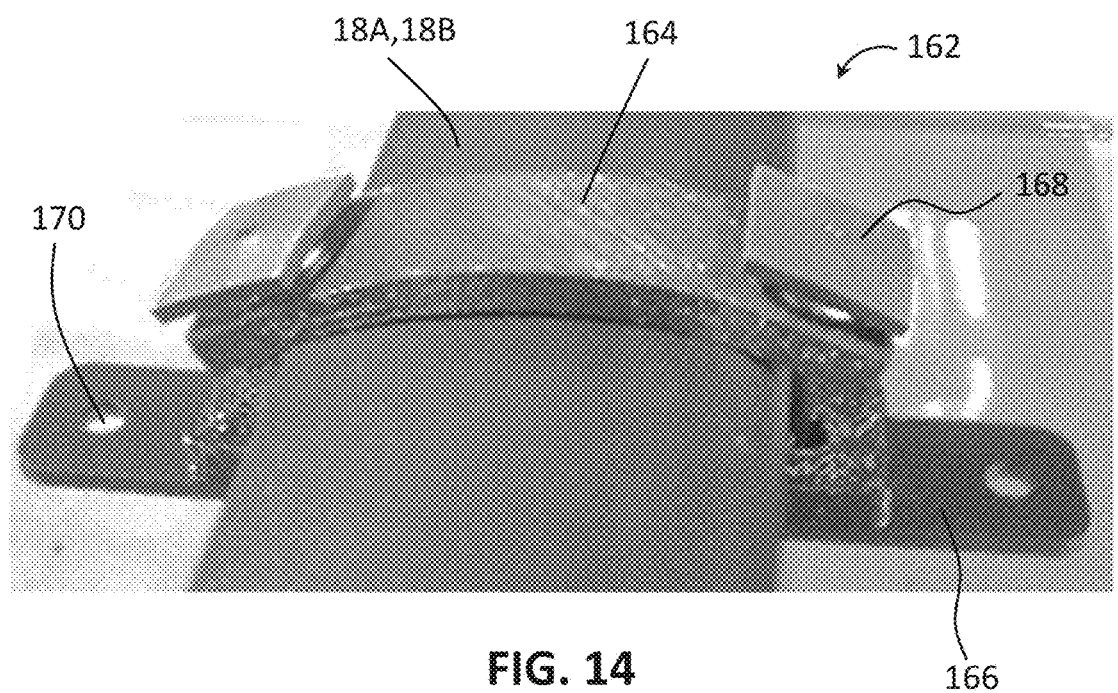
FIG. 14 is a perspective view of a mount.

FIG. 14 illustrates a mount 162. The mount 162 has an upper portion 164 with isolation pads 168 mounted thereon that are configured to contact a bottom of the rack assembly 100, to reduce or eliminate noise or vibrations that may occur during driving conditions of the rack assembly 100 hitting or contacting the mount 162 and/or the cross bars 18A, 18B. The lower portion 166 has apertures 170 for the fastener 140 to pass through to connect the assembly 100 to the cross bars 18A, 18B. The isolation pad may be made of a suitable dampening material, such as plastic, rubber, composite or the like.

The roof rack assembly according to these teachings is configured to be adjustable in size or length. Accordingly, the roof rack assembly may be referred to as being universal, meaning that it can be adjusted or customized in size or length to accommodate a variety of cargo or objects. The roof rack assembly can be customized in size or length to fit a variety of vehicles.

The roof rack assembly is configured to sit close to the vehicle roofline thus providing for a low-profile design. That is, due to the way the roof rack assembly is attached, mounted, or secured to the vehicle, the low-profile design may increase vehicle aesthetics and or vehicle dynamics by reducing drag while the vehicle is moving.

The roof rack assembly may be attached to a vehicle. The vehicle may be virtually any vehicle. For example, the vehicle may be a passenger or commercial car, truck, or SUV; a recreational vehicle (RV); a bus; an all-terrain vehicle (ATV); a camper; golf cart; tractor; trailer; bus; boat; train; etc.

The roof rack assembly may be attached to any structure of the vehicle. As the name suggests, the roof rack assembly is preferably attached to a roof of a vehicle. However, the roof rack assembly may also be attached to a hood, trunk, or cargo bed of a vehicle.

The roof rack assembly is configured to attach to a structure located on the vehicle. The structure may be virtually any structure. The structure may be an original equipment (OE) structure (one that is installed by the vehicle manufacturer). The structure may be an aftermarket structure (one that is installed by or at the direction of a vehicle owner). The structure may be a rail, rod, or pillar. The structure may be a cross bar. The structure may extend along a length of the vehicle (fore-aft direction). The structure may extend along a width of the vehicle (cross-car direction). The structure may be a vehicle cross bar. The vehicle cross bar may be secured to the vehicle roof. The vehicle cross bar may be secured to rails that are attached to the vehicle and extend in a fore aft (front to back) direction. The rails may be raised rails, flush side rails, tracks, or a combination thereof.

The vehicle cross bars may be adjustable. That is, a spacing between the vehicle cross bars can be adjusted. For example, the spacing between the cross bars may be less than about 20 inches, less than about 24 inches, less than about 30 inches, less than about 32 inches, less than about 40 inches, less than about 42 inches. Alternatively, the spacing between the cross bars may be more than about 20 inches, more than about 24 inches, more than about 30 inches, more than about 32 inches, more than about 40 inches, more than about 42 inches. Alternatively, the spacing between the vehicle cross bars may be fixed. The roof rack assembly according to these teachings can be customized in size or length to fit virtually any spacing between the vehicle crossbars. That is, by the nesting or telescoping function of the rails, the length or size of the roof rack assembly can be customized to fit the spacing between the vehicle cross bars.

The vehicle cross bar may have virtually any cross section. For example, the vehicle cross bar may have a square cross section, a wing cross section, an aero blade cross section, a pro bar cross section, or a combination thereof. The roof rack assembly comprises one or more mounts, and the mount according to these teachings is flexible to accommodate virtually any type of vehicle cross bar cross section.

The roof rack assembly maybe installed or positioned in between the vehicle rails that extend in a four aft direction. Alternatively, the roof rack assembly may straddle or be located on top of the rails that extend in the floor up direction. Alternatively refresh assembly may extend over the rails that extend into four off direction and thus conceal the rails from view when an occupant is viewing the vehicle from its side.

The roof rack assembly comprises a first rack portion and a second rack portion. Any reference to the first rack portion may apply to the second rack portion, and vice versa. In some configurations, the roof rack assembly may have only two first rack portions (or only two second rack portions) that are nested together to form the roof rack assembly. However, a preferred roof rack assembly has a first rack portion and a second rack portion.

As disclosed herein, a rack portion refers to a structure that includes one or more rails. For example, a rack portion may include a first rail, a second rail, and a connecting rail. These three rails maybe separate individual pieces that are joined together with one or more fasteners (i.e., screws, bolts, welds, brackets, etc.). In other configurations, a rack portion may refer to a single, monolithic rail that is bent or formed into the shape of the rack portion. A rack portion may have a generally U or C shape. The rails that define a rack portion may be at right angles to one another, meaning two rails may be generally parallel to one another and another rail may be generally perpendicular to the two opposing rails. In other configurations, the rails may be arranged at virtually any non-right angle relative to one another (i.e., acute or obtuse angle).

The rails are described in this application as being a first rail, a second rail, a third rail, a fourth rail, and a connecting rail. Any reference to any of the rails may apply to the other rails. For example, unless otherwise noted, reference to the first rail in this application may likewise refer to the second, third, fourth, and/or connecting rail, and vice versa.

The one or more rails of the rack portions may have virtually any cross section. For example, the cross section may be U- or C-shaped, like shown in the drawings. In other configurations, the cross section may have an O, T, L, or I cross section.

The one or more rails disclosed in this application may be made from virtually any material. For example, the one or more rails may be made from aluminum, steel, metal, plastic, a composite, carbon fiber or a combination thereof. Preferably the rail is made from a lightweight material such as aluminum or carbon fiber. However, plastics may also be used. An exemplary plastic material maybe polypropylene, nylon, a glass filled nylon, or a combination thereof. Preferably a plastic material has UV stabilizing characteristics to prevent fading when exposed to prolong sun.

Two or more of the rails may be configured to nest together. Nest together means that one rail is configured to fit within another rail. Stated another way, one rail may be slightly smaller than the other rail to allow the smaller rail to fit within the larger rail. Stated another way, the rail may include a top flange in opposing bottom flange. A gap defined between the top flange and the bottom flange of one rail may be smaller than the gap defined between the top flange and the bottom flange of another rail. This would allow for the rail that has the smaller gap to fit within the larger gap of the other rail to achieve nesting. When nested together, the top flange of one rail maybe located adjacent or in contact with the top flange of another rail. Similarly, when nested together, the connecting wall of one rail may be located adjacent or in contact with the connecting wall of another rail. When nested together the bottom flange of one rail may be located adjacent to or in contact with the bottom flange of the other rail. In other configurations, if the cross section of the rails is circular or O-shaped, then one rail may fit within another rail.

The nesting feature of two rails that are aligned along a common axis allows the two rails to be moved relative to one another along a common longitudinal axis. This allows for the roof rack assembly to be moved between various configurations thus allowing the roof rack assembly to be extended and or collapsed to customize the size or length of the roof rack assembly. One of the rails may move relative to the other in a telescoping fashion. A low friction material may be provided between the two rails 2 reduced friction between the rails when moving the roof rack assembly between various lengths or positions. For example, a bearing may be provided between the two services. This may reduce the amount of friction between the two rails and allow the roof rack assembly to freely move between an extended and collapsed configuration. However, to reduce cost and weight, the two rails may be free of a material between them.

The one or more rails may have a cutout. The cutout may provide clearance for the one or more vehicle cross bars to pass through the rails and/or rack assembly. The cutout may have virtually any shape. The cutout may be a square, circle, oval, trapezoid. The cutout may match the cross section of the vehicle cross bar. The cutout may have a different shape than the vehicle cross bar. The cut out may be formed by cutting or material removal of the rail. The cut out may be formed during the forming process of the rail. The cut out may be an absence of material. The cut out maybe a hole or aperture. The cut out may be a U-shaped feature. The cutoff may extend through the bottom flange, the connecting wall, and or the top flange of the rail.

Two or more of the cut outs may be aligned. Preferably the cut out defined in the first rail is aligned with the cut out defined in the second rail. And the cut out defined in the third rail is aligned with the cut out in the fourth rail. This alignment allows for a vehicle crossbar to extend through the opposing cut outs when mounting or attaching the roof rack assembly to the vehicle. That is a crossbar assembly located at the front of the vehicle will extend through the cut out defined in the first rail and the second rail. And a vehicle cross bar located at a rear portion of the vehicle will extend through the cutouts aligned in the third and fourth rails.

Roof rack assembly may also include one or more cutouts for accommodating the vehicle rails that extend in a fore-aft direction.

In some configurations a vehicle roof rail may extend along a diagonal or an angle on the vehicle roof accordingly in such a configuration it may be desirable for the cut out in the first rail to be angled or angularly aligned with a cut out in the opposing second rail. The same would be true for the cut-out alignment defined in the 3rd and 4th rails.

In some configurations the first rail and the second rail may have more than one cut out. This may be a situation where the roof rack assembly is intended for a larger vehicle that has more than two vehicle crossbars. Accordingly in such a configuration it may also or instead be desirable for the third and 4th rails to have more than one pair of opposing cutouts to accommodate additional vehicle crossbars.

The rails may have one or more apertures. The one or more apertures may have virtually any size and shape. For example, the one or more apertures may be circles, ovals, squares, diamonds, triangles, rectangles, or the like. The one or more apertures may be elongated slots. The one or more apertures may be purely for declarative or aesthetic purposes. The one or more apertures may serve one or more functional purposes, such as, for example: joining or attaching the one or more cross bars to the rack portion; as an attachment point for securing or attaching cargo to the rack assembly via one or more tie down straps, ropes, chains, or bungee cords; an attachment point for securing or attaching one or more adapters or mounts (i.e., a mount for securing a ladder or bicycle, for example); as an attachment point for securing or attaching one or more accessories such as a light, gas can, spare tire, etc.; used for styling purposes; or a combination thereof.

The rails may have a top flange and a bottom flange. The top and bottom flanges may oppose each other period the top and bottom flanges may be parallel to one another or maybe arranged in planes that bisect one another. The top end or bottom flanges may include one or more apertures. The one or more apertures may be used to attach one or more accessories to the rail, may be used to attach the crossbars to the rail, or a combination thereof.

The roof rack assembly may comprise one or more inner cross bars. Any reference to an inner cross bar may apply to an outer cross bar, and vice versa.

An inner crossbar is a crossbar that is part of the roof rack assembly. An inner crossbar refers to the crossbar that is located in between two outer crossbars. A first outer crossbar may be located at up front edge or portion of the roof rack assembly and a second outer crossbar may be located at our rear edge or portion of the roof rack assembly. The inner crossbar and the outer crossbar may have virtually the same function and purpose, and thus may share similar structure. Dana crossbar includes one or more mounting flanges for attaching the inner crossbar to one or more of the rails. Preferably the inner crossbar is attached to two opposing rails (i.e., the first and second or the third or fourth rails). intercross bar maybe dimension so that it can be installed between the first and second rails and or between the 3rd and 4th rails. This may allow the roof rack assembly to be further universal. The inner crossbar includes one or more apertures discussed further below.

The roof rack assembly may comprise one or more outer cross bars. Any reference to an outer cross bar may apply to an inner cross bar, and vice versa.

An outer crossbar is a crossbar that is part of the roof rack assembly. An outer crossbar refers to the crossbar that is located outside of at least one inner crossbar. The inner crossbar and the outer crossbar may have virtually the same function and purpose, and thus may share similar structure. An outer cross bar includes one or more mounting flanges for attaching the outer crossbar to one or more of the rails. Preferably the outer crossbar is attached to two opposing rails (i.e., the first and second or the third or fourth rails). The outer crossbar maybe dimension so that it can be installed between the first and second rails and or between the 3rd and 4th rails. This may allow the roof rack assembly to be further universal. The outer crossbar includes one or more apertures discussed further below.

The outer crossbar may be installed in virtually any location between the rails. Preferably the outer crossbar is installed in a location that spans between opposing cut outs. When installed on the vehicle, a vehicle crossbar may extend below an outer crossbar. In other configurations, when installed in vehicle, a vehicle crossbar may extend adjacent to an outer crossbar.

The outer crossbar may include one or more flanges. The one or more flanges may be used to attach or connect the outer crossbar to the opposing rails. The one or more flanges may also be used to secure the outer crossbar and or the roof rack assembly to the vehicle. The one or more flanges may be used to cooperate with a mount to hug or clamp the outer crossbar end or the roof rack assembly to the vehicle crossbar. Then one or more flanges may be located at opposing ends of the outer crossbar. Then one or more flanges may be located at opposing lateral sides or edges of the cross bar. The one more flanges may be an integral piece with the crossbar. Or the one or more flanges maybe separate components that are fastened to the main extension of the crossbar.

The one or more flanges for mounting the crossbar to the one or more rails maybe an inwardly turned flange that includes an aperture. The flange aperture may be aligned with an aperture defined in the rail to secure the outer crossbar to the rail.

The roof rack assembly may include one or more shims. The one or more shims may function to take up space between an end of the inner crossbar and or the outer crossbar and the rail. A shim may be required because the spacing between the first rail and the second rail is different than the spacing between the third rail and the 4th rail. This difference in spacing may be required to accommodate the nesting feature of the roof assembly. That is because the first rail and the second rail fit within the third rail in the fourth rail, the spacing between the third rail and the 4th rail is larger than the spacing between the first round the second rail. Accordingly, the Shim may be used in between the third rail and the 4th rail to take up the larger spacing. However, in other configurations the Shim maybe part of the inner crossbar and or the outer crossbar. In such a configuration the crossbar may be specific to fit between only the first rail and the second rail or between the third rail in the 4th rail. The shim may have a horizontal component, a vertical component or both. This shim may be attached to an end of the crossbar. The shim may be attached to the rail. The shim may be attached to the rail and or the crossbar via one or more fasteners, and adhesive, or simply sandwiched in between.

The roof rack assembly may include one or more mounts. A mount may be configured to secure the roof rack assembly to the vehicle structure or crossbar. The mount may be a clamp that at least partially clamps or surrounds a vehicle crossbar. A clamp may be secured to one or more of the rails. A clamp may be secured to one or more of the crossbars (inner and/or outer). a clamp may be secured to one or more of the flanges of the inner crossbar and or the outer crossbar and over the rail. the mount may be a couple clamp. The mount may include one or more fasteners. The one or more fasteners maybe a U bolt. The water more fasteners maybe a straight bolt. The one or more fasteners maybe a zip tie. The roof rack assembly may include one or more mounts. two or more mounts, three or more mounts, or four more mounts. For example, the roof rack assembly may include a front mount for securing the assembly to the front vehicle crossbar and a rear mount for securing the roof rack assembly to the rear crossbar. In some configurations the roof rack assembly may also be connected to the vehicle rails that extend in a fore-aft direction. A mountain may also be provided to attach the roof rack assembly to these rails.

The mount may include a vibration reducing feature to reduce vibrations of the roof rack assembly on the vehicle during movement of the vehicle. This may advantageously prevent the roof rack assembly from damaging the vehicle crossbars. This may also help increase the grip of the mount on the vehicle crossbar to reduce chances of the roof rack assembly moving or vibrating during use.

The explanations and illustrations presented herein are intended to acquaint others skilled in the art with the invention, its principles, and its practical application. The above description is intended to be illustrative and not restrictive. Those skilled in the art may adapt and apply the invention in its numerous forms, as may be best suited to the requirements of a particular use.

Accordingly, the specific embodiments of the present invention as set forth are not intended as being exhaustive or limiting of the teachings. The scope of the teachings should, therefore, be determined not with reference to this description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

Plural elements or steps can be provided by a single integrated element or step. Alternatively, a single element or step might be divided into separate plural elements or steps.

The disclosure of "a" or "one" to describe an element or step is not intended to foreclose additional elements or steps. For example, disclosure of "a motor" does not limit the teachings to a single motor. Instead, for example, disclosure of "a motor" may include "one or more motors."

While the terms first, second, third, etc., may be used herein to describe various elements, components, regions, layers and/or sections, these elements, components, regions, layers and/or sections should not be limited by these terms. These terms may be used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below", or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The invention illustratively disclosed herein suitably may be practiced in the absence of any element which is not specifically disclosed herein.

Any of the elements, components, regions, layers and/or sections disclosed herein are not necessarily limited to a single embodiment. Instead, any of the elements, components, regions, layers and/or sections disclosed herein may be substituted, combined, and/or modified with any of the elements, components, regions, layers and/or sections disclosed herein to form one or more embodiments that may be or not be specifically illustrated or described herein.

The disclosures of all articles and references, including patent applications and publications, testing specifications, are incorporated by reference for all purposes. Other combinations are also possible as will be gleaned from the following claims, which are also hereby incorporated by reference into this written description.

The invention claimed is:

1. A roof rack assembly for a vehicle, comprising:
a first rack portion comprising a first rail and an opposing second rail;
a second rack portion comprising a third rail and an opposing fourth rail;
wherein the first rail has a cutout, and the second rail has a cutout, and the cutout of the first rail is configured to align with the cutout of the second rail;
wherein a structure associated with the vehicle is configured to extend through the aligned cutouts of the first rail and the second rail when the roof rack assembly is installed on the vehicle; and
wherein the roof rack assembly comprises an inner cross bar and an outer cross bar, and the outer cross bar is configured to connect the roof rack assembly to the structure associated with the vehicle.

2. The roof rack assembly according to claim 1, wherein the first rail has a top flange and a bottom flange and the third rail has a top flange and a bottom flange, wherein a gap defined between the top flange and the bottom flange of the first rail is smaller than a gap defined the top flange and the bottom flange of third rail so that the first rail nests within the third rail when the cutout of the first rail is aligned with the cutout of the third rail.

3. The roof rack assembly according to claim 1, wherein the roof rack assembly comprises a mount and the outer cross bar comprises a lateral flange, the mount is configured to engage the lateral flange and the vehicle cross bar to connect the roof rack assembly to the vehicle.

4. The roof rack assembly according to claim 3, wherein the outer cross bar and the vehicle cross bar extend in the same direction and the outer cross bar is located on top of the vehicle cross bar.

5. A roof rack assembly for a vehicle, comprising:
a first rack portion comprising a first rail and an opposing second rail;
a second rack portion comprising a third rail and an opposing fourth rail;
wherein the first rail has a cutout, and the second rail has a cutout, and the cutout of the first rail is configured to align with the cutout of the second rail;
wherein a structure associated with the vehicle is configured to extend through the aligned cutouts of the first rail and the second rail when the roof rack assembly is installed on the vehicle;
wherein the first rail has a top flange and a bottom flange and the third rail has a top flange and a bottom flange, wherein a gap defined between the top flange and the bottom flange of the first rail is smaller than a gap defined the top flange and the bottom flange of third rail so that the first rail nests within the third rail when the cutout of the first rail is aligned with the cutout of the third rail; and
wherein the roof rack assembly comprises an inner cross bar and an outer cross bar, and the outer cross bar is configured to connect the roof rack assembly to the structure associated with the vehicle, the outer cross bar and the structure associated with the vehicle extend in the same direction and the outer cross bar is located on top of the structure associated with the vehicle.

6. The roof rack assembly according to claim 5, wherein the inner cross bar comprises a mounting flange for connecting the inner cross bar to the bottom flange of the first rail and/or the third rail, and wherein the structure associated with the vehicle is a vehicle cross bar.

7. The roof rack assembly according to claim 5, wherein the outer cross bar comprises a mounting flange for connecting the inner cross bar to the bottom flange of the first rail and/or the third rail.

8. The roof rack assembly according to claim 7, wherein the inner cross bar and the outer cross bar comprise one or more apertures for connecting one or more accessories to the roof rack assembly.

9. The roof rack assembly according to claim 7, wherein the roof rack assembly comprises a shim that is placed between an end of the inner cross bar or the outer cross bar, when the inner cross bar or the outer cross bar extends between the third cross bar and the fourth cross bar.

10. A roof rack assembly for a vehicle, the vehicle comprising one or a plurality of vehicle cross bars that extend in a cross-car direction of the vehicle, the roof rack assembly comprising:
  a first rack portion comprising a first rail and an opposing second rail,
  a second rack portion comprising a third rail and an opposing fourth rail,
  wherein the first rail has a cutout, and the second rail has a cutout, and the cutout of the first rail is configured to align with the cutout of the second rail after the first rail is nested together with the third rail;
  wherein third first rail has a cutout, and the fourth rail has a cutout, and the cutout of the third rail is configured to align with the cutout of the fourth rail after the second rail is nested together with the fourth rail;
  wherein a first of the vehicle cross bars is configured to extend through the aligned cutouts of the first rail and the second rail; and
  wherein a second of the vehicle cross bars is configured to extend through the aligned cutouts of the third rail and the fourth rail; and
  wherein the roof rack assembly further comprises an inner cross bar and an outer cross bar, and the outer cross bar is configured to connect the roof rack assembly to the structure associated with the vehicle.

11. The roof rack assembly according to claim 10, wherein the first rail, the second rail, the third rail, and/or the fourth rail has a U-shaped cross section.

12. The roof rack assembly according to claim 10, wherein the first rail is configured to nest within the third rail.

13. The roof rack assembly according to claim 12, wherein the second rail is configured to nest within the fourth rail.

14. The roof rack assembly according to claim 13, wherein the first rail is generally parallel to the second rail.

15. The roof rack assembly according to claim 14, wherein the third rail is generally parallel to the fourth rail.

16. The roof rack assembly according to claim 14, wherein the first rack portion comprises a connecting rail that extends between and connects the first rail and the second rail.

17. The roof rack assembly according to claim 16, wherein the second rack portion comprises a connecting rail that extends between and connects the third rail and the fourth rail.

18. The roof rack assembly according to claim 9, wherein both of the first rail and the third rail have a U-shaped cross section, and a cross section of the first rail is smaller than a cross section of the third rail so that the first rail nests within the third rail when the cutout of the first rail is aligned with the cutout of the third rail.

19. The roof rack assembly according to claim 18, wherein both of the second rail and the fourth rail have a U-shaped cross section, and a cross section of the second rail is smaller than a cross section of the fourth rail so that the second rail nests within the fourth rail when the cutout of the second rail is aligned with the cutout of the fourth rail.

* * * * *